B. J. DOWNING.
Horse Hay-Rakes.
No. 5,704. Reissued Dec 23, 1873.
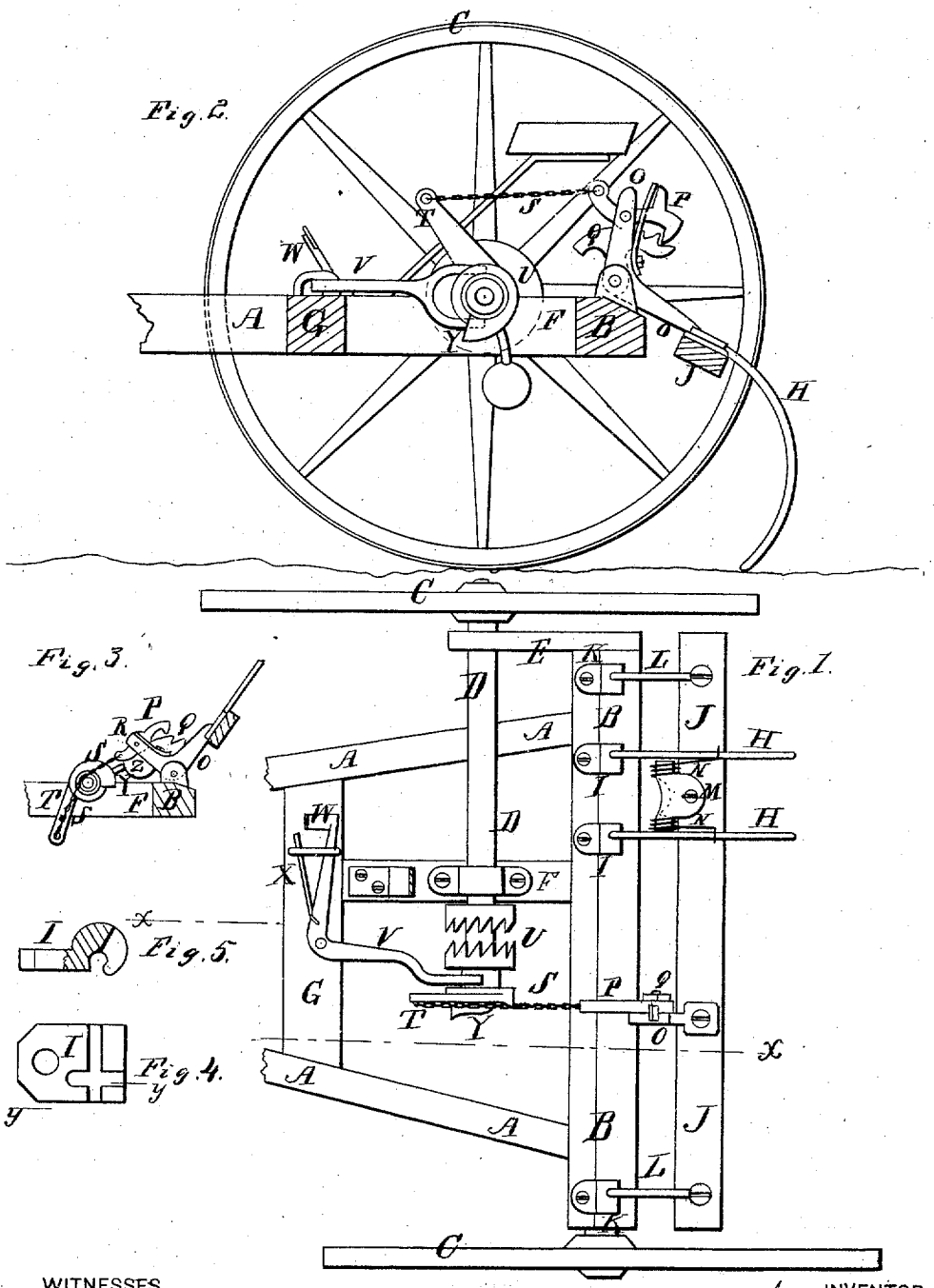
WITNESSES
George E. Upham.
D. D. Frame,
INVENTOR
Burton J. Downing,
By Chipman & Farmer & Co
ATTORNEYS.
A.M. PHOTO-LITHOGRAPHIC Co. N.Y. (OSBORNE'S PROCESS)

UNITED STATES PATENT OFFICE.

BURTON J. DOWNING, OF MITCHELL, IOWA.

IMPROVEMENT IN HORSE HAY-RAKES.

Specification forming part of Letters Patent No. 143,278, dated September 30, 1873; reissue No. 5,704, dated December 23, 1873; application filed November 22, 1873.

*To all whom it may concern:*

Be it known that I, BURTON J. DOWNING, of Mitchell, in the county of Mitchell and State of Iowa, have invented new and useful Improvements in Horse Hay-Rakes, of which the following is a specification:

Figure 1 of the drawings is a top view of my hay-rake. Fig. 2 is a vertical section of the same, taken through the line *x x*, Fig. 1. Fig. 3 is a detail view of the device for raising the rake-teeth. Fig. 4 is a detail view of one of the hinges. Fig. 5 is a detail section of the same, taken through the line *y y*, Fig. 4.

This invention relates to certain novel improvements on horse hay-rakes, wherein the power of the horse is utilized for raising the rake-teeth and discharging the gathered loads. The nature of my invention consists, first, in arranging one of the transporting-wheels on a short axle, which is arranged in front of the main supporting-axle in suitable bearings, and provided on one end with a clutching device, which is connected to a treadle, and also to a rake elevating and tripping device; second, in a gravitating-clutch, which is connected by a chain to a holding-down pawl on an elevating-lever, and which is constructed with a beveled tripping-lug on one end of its collar, for the purpose of raising the rake-teeth and holding them in an elevated position until the load is discharged, and then allowing the teeth to drop, as will be hereinafter explained; third, in a gravitating-pawl, applied on an angular lifting-lever, and combined with a toothed arc fixed to the main axle, for the purpose of holding down the rake-teeth when they are at work, as will be hereinafter explained; fourth, in T-shaped spring-holders, which are secured to a bar arranged in rear of the main axle and beneath the rake-teeth, to which holders springs are attached, and coiled around projecting arms thereon, to keep the rake-teeth down to their work and allow them to yield in passing over obstructions, as will be hereinafter explained.

The following is a description of my improvements:

In the annexed drawings, A A represent the thills, the rear ends of which are rigidly attached to the axle B. Upon one end of the axle B, which I shall denominate the "main axle," a journal is applied, upon which one of the wheels C revolves. The other wheel C is rigidly attached to an axle, D, which revolves in bearings in an arm, E, attached to one end of axle B, and in bearings on a bar, F, one end of which latter is secured to axle B, and the other end to a cross-bar, G, of the thills A. H are the rake-teeth, which are curved in the usual manner, whose upper ends are bent at right angles and inserted into grooves in plates I, which are secured to the axle B, and which thus hinge the teeth to this axle. The main portions of the teeth pass out of the grooved plates I through vertical slots, the sides of which sustain the teeth against lateral movement at those points. These plates afford excellent pivotal connections for the teeth, and should a tooth be broken its place can be readily supplied by another. Figs. 4 and 5 clearly show the construction of these pivotal holders. J is a bar, placed in rear of and parallel to the axle B, which bar is hinged to this axle by grooved and slotted plates K, similar to the plates I, and by rods or arms L, similar to the upper parts of the teeth H. To the bar J, between the teeth H, T-shaped holders M are secured, around the lateral arms of which spring-wires are coiled, so as to form two springs, N N, for each holder, the ends of which springs are carried backward and hooked over the rake-teeth. These springs N hold the teeth down upon the lifting-bar J, but allow them to rise while passing over obstructions without being injured. O is a bent lever, which is pivoted at its angle to the main axle B, and connected by its rear arm to the lifting-bar J. To the upper arm of this lever O a pawl, P, is pivoted, the engaging end of which takes hold of the teeth of an arc or curved rack, Q, which is attached rigidly to the axle B on one side of lever O. To the other end of the lever-pawl P is attached the end of a chain, S, the other end of which latter is attached to the end of an arm, T, which is rigidly secured to the movable part of clutch-sleeve U, that works loosely on the inner end of the axle D. V is a bent lever, the rear forked end of which embraces the annularly-grooved portion of the movable part of clutch U. This lever V is pivoted at its angle to the cross-bar G, and its forward end extends laterally along this bar, where its movements are limited by a keeper, W, attached to bar G. The lever V is held in position to keep the movable part of the clutch U away from that part which is keyed on shaft D by means of a spring, X. Upon the outer end of the movable part of the clutch U a beveled tooth, Y, is formed, the object of which is to catch the chain S when the rake-teeth are fully raised, and hold up these teeth while passing over a windrow, after which the chain will slip off the beveled surface of said tooth and allow the rake-teeth to drop into raking position. The movable part of the clutch U is brought into proper position for allowing pawl P to engage with its rack Q by means of a weight, Z, connected to said movable part of the clutch by means of an arm, which is arranged opposite the arm T, to which the lifting-chain S is attached. By this construction, when a sufficient amount of hay has been collected by the teeth H, the driver, with his foot, pushes forward the front treadle part of lever V, which throws the two parts of the clutch together. This causes the clutch to turn with the axle D and draw chain S forward, the first effect being to disengage pawl P from the rack Q. The second effect is to draw the upper arm of the lever O forward, which raises the rake-teeth and discharges the gathered load. The arm T makes a revolution at each discharge of a load, and carries with it the chain S, which engages with the tooth Y and holds up the rake-teeth until the machine passes over a windrow. The rake is then dropped and held down by the pawl P, as above described. Immediately after the driver pushes forward the front part of lever V, and throws the two parts of the clutch U together, he should remove his foot from said lever, and allow the chain S to keep the clutch engaged until this chain slips off the tooth Y, when spring X will disengage the two parts of the clutch.

What I claim as new, and desire to secure by Letters Patent, is—

1. The short axle D, on which wheel C is keyed, applied in bearings in front of the main axle B, in combination with clutch U, treadle-lever V, chain S, and lever O for lifting the rake-teeth, substantially as described.

2. The arm T and gravitating-weight Z, applied to one of the collars of clutch U, in combination with the connecting-chain S, the pawl P on elevating-lever, and the rack Q, substantially as and for the purposes described.

3. The beveled lug or tooth Y on one of the clutch-collars on axle D, in combination with the chain S and elevating-lever O, as and for the purposes described.

4. The gravitating-pawl P, pivoted to the lifting-lever O, in combination with the fixed rack Q and elevating and tripping devices, substantially as and for the purposes described.

5. In a horse hay-rake, the rigid T-shaped holder M, attached to the bar J, and having extended arms, as shown, to support the coils of the continuous coiled spring N, constructed and arranged substantially as specified.

In testimony that I claim the above I have hereunto subscribed my name in the presence of two witnesses.

BURTON J. DOWNING.

Witnesses:
PHIL. C. MASI,
GEORGE E. UPHAM.